United States Patent
Cinpinski et al.

(10) Patent No.: US 6,672,281 B1
(45) Date of Patent: Jan. 6, 2004

(54) MOBILITY ENHANCEMENT SYSTEM FOR ELECTRONIC THROTTLE CONTROLLED VEHICLES

(75) Inventors: Kenneth J. Cinpinski, Ray, MI (US); Gary L. Talbot, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/391,935

(22) Filed: Mar. 18, 2003

(51) Int. Cl.$^7$ ................................. F02D 9/00
(52) U.S. Cl. ..................... 123/396; 123/399; 123/400
(58) Field of Search ............................ 123/396, 399, 123/400, 395

(56) References Cited

U.S. PATENT DOCUMENTS 5,235,951 A * 8/1993 Taguchi et al. ............. 123/397
6,302,084 B1 * 10/2001 Kamimura et al. ......... 123/399

OTHER PUBLICATIONS

Generic Mobility Enhancement System for a Motor Vehicle, on the market since at least Jan. 1, 2002.

* cited by examiner

Primary Examiner—Bibhu Mohanty
(74) Attorney, Agent, or Firm—Laura C. Hargitt

(57) ABSTRACT

An electronic enhanced mobility control interface of a mobility enhancement system implemented in a motor vehicle having a conventional electronic throttle control system. The electronic enhanced mobility throttle interface includes an auxiliary electronic throttle sensor in duplication of the conventional throttle pedal electronic throttle sensor, wherein the driver's selection of either the auxiliary or throttle pedal position throttle sensor is interfaced transparently to an engine electronic controller, as for example an engine control module (ECM/PCM) for processing to the electronic throttle control (ETC) subsystem. The electronic mobility enhancement throttle interface further includes an auxiliary throttle control by which the driver executes throttle commands to the auxiliary electronic throttle sensor, a data switch for connecting one or the other of the throttle pedal position and auxiliary electronic throttle sensors processing electronics to the ECM/PCM.

11 Claims, 5 Drawing Sheets

MOBILITY ENHANCEMENT SYSTEM FOR ELECTRONIC THROTTLE CONTROLLED VEHICLES

TECHNICAL FIELD

The present invention relates generally to motor vehicles equipped with an electronic throttle control, and further relates to motor vehicles equipped with a mobility enhancement system for drivers with physical disabilities. More particularly, the present invention relates to a mobility enhancement system featuring an electronic mobility enhancement throttle interface for the conventional electronic throttle control system of the motor vehicle.

BACKGROUND OF THE INVENTION

It is estimated that 88,082 U.S. drivers currently use mobility enhancement system hand controls for controlling vehicle operation, and that 43,623 U.S. drivers currently use a prosthetic aid for vehicle operation. Drivers requiring a mobility enhancement system for controlling vehicle operation are limited in their selection of hardware. Quite frequently, their selection involves thoughtful considerations regarding performance and convenience when attempting to address their specific needs. Often, their motor vehicle selection is limited to a small cross-section of products and is dictated by the available mobility enhancement control hardware.

Generally, drivers with disabilities who require a mobility enhancement system must settle for a purely mechanical mobility enhancement system, as exemplified by the mobility enhancement system 10 shown at FIGS. 1 through 4. In this regard, the mobility enhancement system 10 includes a mechanical brake pedal interface 10' and a mechanical throttle pedal interface 10".

In operation of the mechanical brake pedal interface 10', the brake pedal 12 is actuated by directing a brake force $F_B$ via the driver gripping a handgrip 16 and then downwardly pivoting a control arm 14, whereby an interconnect member 18 applies the brake force onto the brake pedal. In operation of the mechanical throttle pedal interface 10", the throttle pedal (commonly referred to as a "as pedal") 20 is depressed by the driver applying a rotational movement (see arrow R) to the control arm 14. The rotational movement is converted into a downward throttle pedal force $F_T$ via a linkage assembly 22, to thereby selectively depress the throttle pedal 20.

For motor vehicles equipped with an electronic throttle control system 24, a throttle pedal position electronic throttle sensor 28 is incorporated in a throttle pedal housing 26. For example, the throttle pedal position electronic throttle sensor 28 is in the form of two potentiometers which, in conjunction with the position of the throttle pedal, provide throttle control information or a throttle control transfer function as analog inputs to an engine control module (ECM/PCM) 30 for processing the throttle (also referred to as "torque") command to an electronic throttle control (ETC) subsystem 32.

The force to depress the throttle pedal 20 is primarily dependent on return biasing of the throttle pedal by a pedal return spring which is associated with the throttle pedal housing 26. To minimize the throttle pedal force $F_T$ required to overcome this biasing force, the control arm 14 is lengthened to increase the mechanical advantage the physically disabled driver has over the pedal return spring. Because of the length of the control arm 14, there is a need to minimize interference with interior vehicle components such as the inner door pull 34 and armrest 36 (see FIG. 2). Also taken into consideration is the potential for the downward rotational movement R of the control arm 14 to necessitate an accommodating repositioning of the driver's left leg (see FIGS. 2 and 3).

Accordingly, what is needed in the art is a mobility enhancement system for drivers with disabilities which has none of the disadvantages of current mechanical mobility enhancement throttle pedal interfaces.

SUMMARY OF THE INVENTION

The present invention is an electronic enhanced mobility control interface of a mobility enhancement system implemented in a motor vehicle having a conventional electronic throttle control system. The electronic enhanced mobility throttle interface includes an auxiliary electronic throttle sensor in duplication of the throttle pedal position electronic throttle sensor, wherein the driver's selection of either the auxiliary electronic throttle sensor or the throttle pedal position electronic throttle sensor is interfaced transparently to an engine electronic controller, as for example an engine control module (ECM/PCM) for processing to the electronic throttle control (ETC) subsystem.

The electronic mobility enhancement throttle interface includes, besides the aforementioned auxiliary electronic throttle sensor, an auxiliary throttle control by which the driver executes throttle commands to the auxiliary electronic throttle sensor and a data switch for connecting one or the other of the throttle pedal position electronic throttle sensor and the auxiliary electronic throttle sensor processing electronics to the ECM/PCM, wherein the auxiliary electronic throttle sensor is a functional duplicate of the throttle pedal position electronic throttle sensor. Accordingly, selection by the driver of either the auxiliary electronic throttle sensor or the throttle pedal position electronic throttle sensor is transparent to the ECM/PCM for processing as throttle commands to the ETC subsystem, wherein the throttle pedal position electronic throttle sensor is the default selection.

The present invention provides for minimal force application to effect throttle commands, eliminates the need to mechanically depress the existing throttle pedal, and provides for the choice of utilizing the conventional throttle pedal or the auxiliary throttle control for executing throttle commands.

The present invention also prevents a change of source of throttle command as long as the ignition switch is turned on. Additionally, a time-out is preferably provided which times from selection of a source of throttle command to turning on of the ignition switch, and defaults to the throttle pedal position electronic throttle sensor in the event of a time-out before the ignition switch is turned on.

Accordingly, it is an object of the present invention to provide a mobility enhancement system for physically disabled drivers which features an electronic mobility enhancement throttle interface including an auxiliary electronic throttle sensor in duplication of the conventional throttle pedal position electronic throttle sensor.

This and additional objects, features and advantages of the present invention will become clearer from the following specification of a preferred embodiment.

DESCRIPTION OF THE PREFERRED EMBODIMENT

Figure 1:
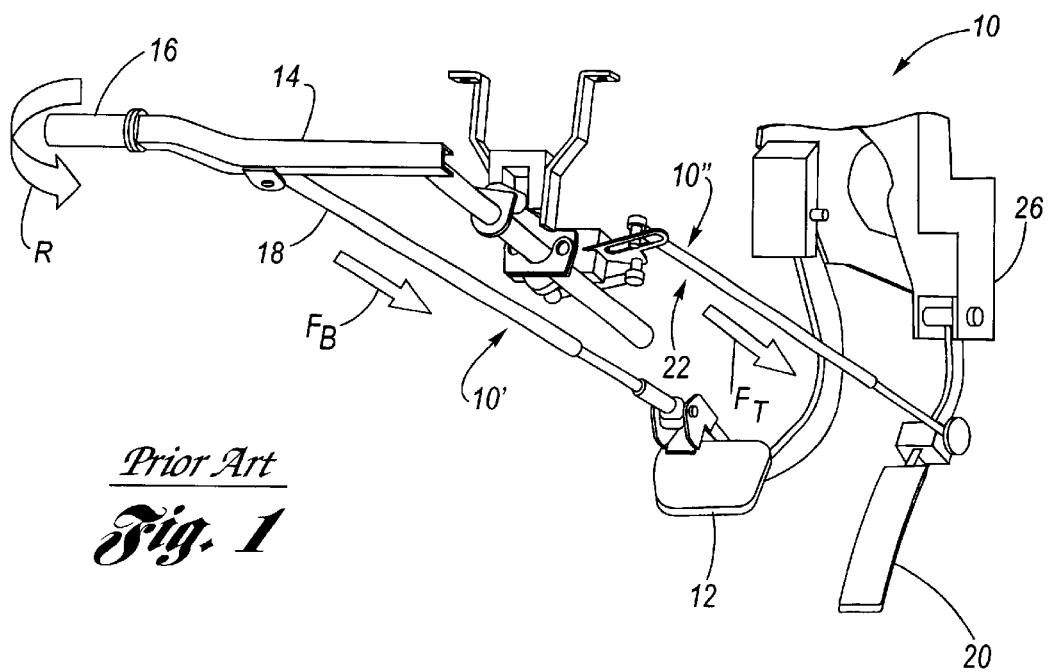
FIG. 1 is a first perspective view of a prior art mechanical mobility enhancement system.
Figure 2:
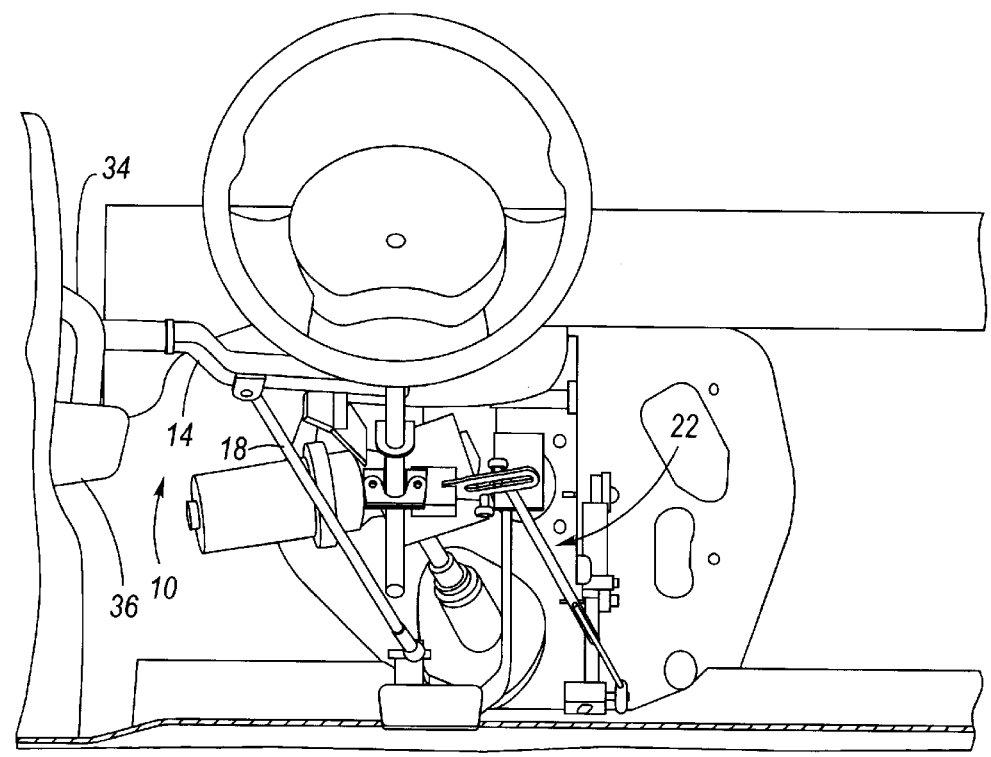
FIG. 2 is a second perspective view of the prior art mechanical mobility enhancement system of FIG. 1.
Figure 3:
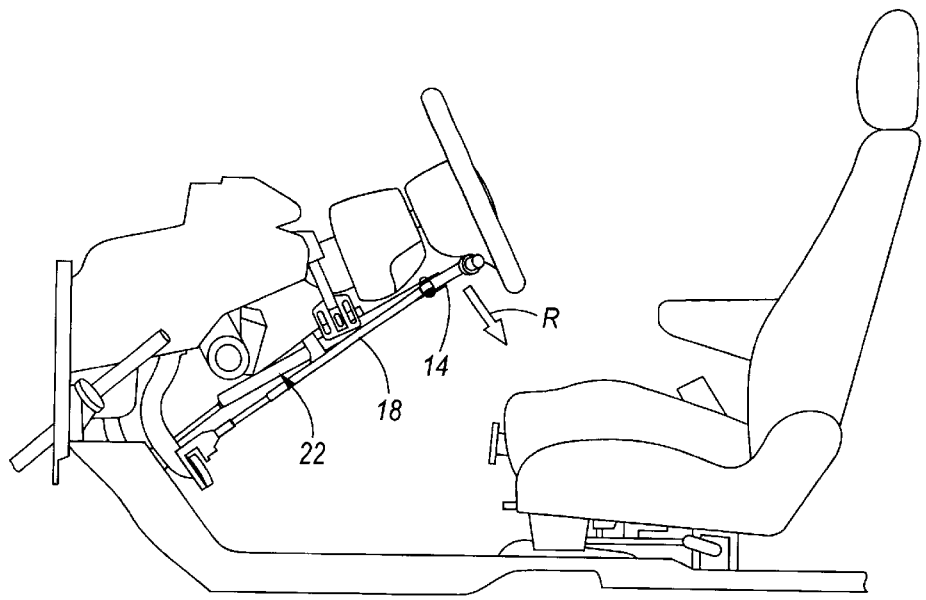
FIG. 3 is a side view of prior art mechanical mobility enhancement system of FIG. 1.
Figure 4:
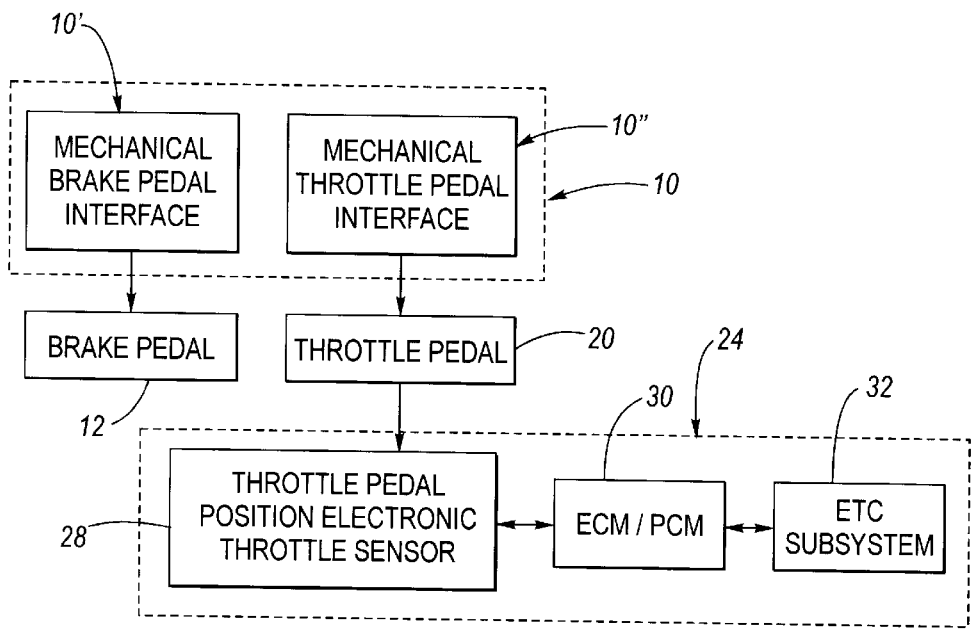
FIG. 4 is a block diagram of the prior art mechanical mobility enhancement system interfaced to a motor vehicle equipped with an electronic throttle control system.

Referring now to the Drawings, FIGS. 5 through 8 depict various aspects of an electronic mobility enhancement system 100 according to the present invention which includes an electronic mobility enhancement throttle interface 102.

Figure 5:
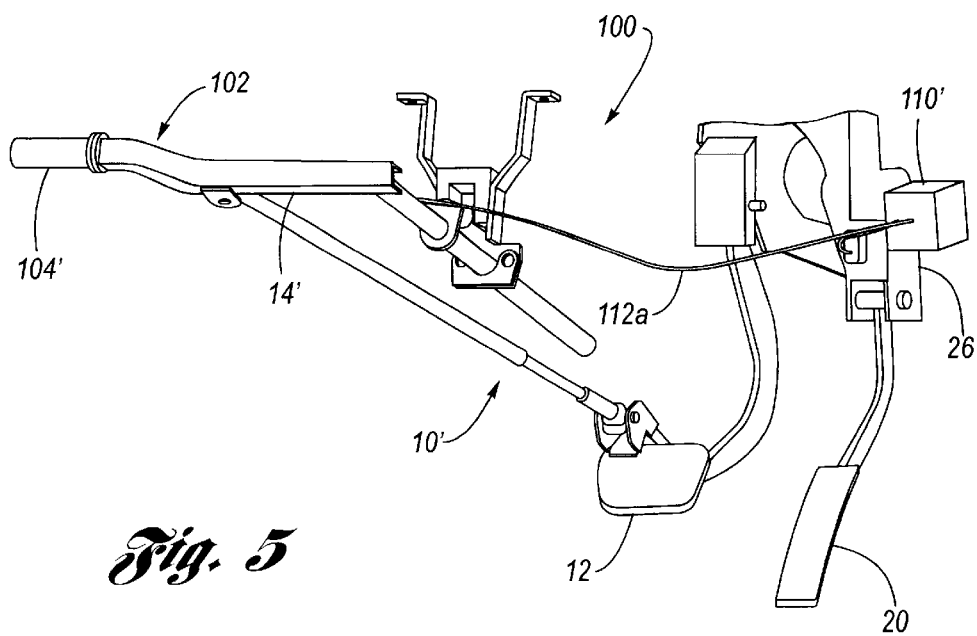
FIG. 5 is a perspective view of an example of the preferred environment of use of a mobility enhancement system according to the present invention.
Figure 6:
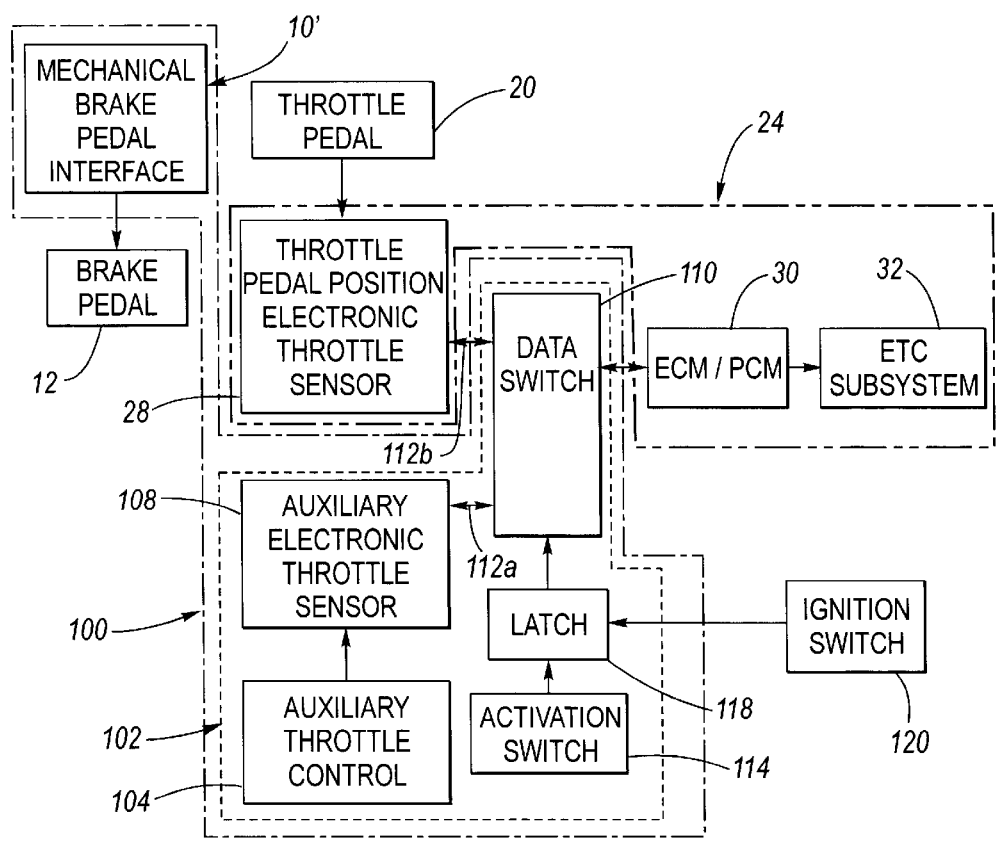
FIG. 6 is a block diagram of the mobility enhancement system of FIG. 5 interfaced to a motor vehicle equipped with an electronic throttle control system.

FIG. 5 depicts an example of the preferred environment of use of the mobility enhancement system 100 incorporated into a motor vehicle equipped with an electronic throttle control system 24. In this example, the electronic mobility enhancement interface 102 consists of an auxiliary throttle control 104 (as for example a hand operated twist grip 104') which allows a driver to select throttle commands to an auxiliary electronic throttle sensor 108 (for example located in the twist grip 104'), a data switch 110 including processing electronics, first and second throttle signal connections 112a, 112b from, respectively, each of the auxiliary electronic throttle sensor 108 and the conventional throttle pedal position electronic throttle sensor 28 to the data switch 110 (located within a data box 110'), an activation switch 114 for driver selection of the auxiliary electronic throttle control sensor at the data switch, and an electrical connection 116 from the data switch to the ECM/PCM 30. Preferably, the electronic mobility enhancement interface 102 further includes a time-out latch 118 electrically interfaced with the ignition switch 120, the activation switch 114 and the data switch 110. The latch 118 serves as a safety feature by preventing a change of source of throttle command as regards the throttle pedal position electronic throttle sensor 28 and the auxiliary electronic throttle sensor 108, as long as the ignition switch is turned on. In operation, before the ignition switch is turned on, the driver can select which one of the auxiliary electronic throttle sensor 108 and the throttle pedal position electronic throttle sensor 28 is to be interfaced with the vehicle ECM/PCM 30 for processing as the throttle input command to the ETC subsystem 32.

Per the present example, the auxiliary electronic throttle sensor 108 is located within the twist grip 104', and the twist grip is rotatably mounted to a control arm 14'. Where present, the control arm may serve the above described mechanical braking function relative to a mechanical brake pedal interface 10'. The auxiliary electronic throttle sensor 108 duplicates the throttle pedal position electronic throttle sensor 28 which is connected to the throttle pedal 20. For example, each of the throttle pedal position electronic throttle sensor 28 and the auxiliary electronic throttle sensor 108 consist, in the present example, of two potentiometers. When the auxiliary electronic throttle sensor 108 has been selected by the driver, desired amounts of rotation of the twist grip provide desired throttle commands to the ECM/PCM 30. In this regard, the ECM/PCM 30 interfaces transparently (that is, identically) with either of the auxiliary or throttle pedal position electronic throttle sensors 108, 28.

It is understood that the auxiliary electronic throttle sensor 108 may consist of single or multiple contacting or non-contacting control devices (mechanical, optical, magnetic, etc.) whereby the driver can vary the throttle commands to the ECM/PCM 30 with a transfer function identical to the throttle pedal position electronic throttle sensor 28. Also, the auxiliary throttle control 104 may be, besides the twist grip 104', a squeeze lever, a thumb button, a left foot throttle, or other control, wherein the activation switch may be incorporated within the auxiliary throttle control, or elsewhere.

The first throttle signal connection 112a provides power and signal transfer between the auxiliary electronic throttle sensor 108 and processing electronics of the data switch 110. If the auxiliary electronic throttle sensor 108 is selected by the driver via actuation of the activation switch 114, the processing electronics of the data switch 110 passes throttle commands (also referred to as "torque commands") from the auxiliary electronic throttle sensor as inputs to the ECM/PCM 30 for processing as the throttle (torque) input command to the ETC subsystem 32, and passes power from the ECM/PCM to the auxiliary electronic throttle sensor.

However, if the throttle pedal position electronic throttle sensor 28 is selected (as for example by driver default or by time out of the latch 118), the processing electronics of the data switch 110 passes throttle commands (torque commands) from the throttle pedal position electronic throttle sensor 28 as inputs to the ECM/PCM 30 for processing as the throttle (torque) input command to the ETC subsystem 32, and passes power from the ECM/PCM to the throttle pedal position electronic throttle sensor via the second throttle signal connection 112b. The latch 118 interfaces with the processing electronics of the data switch 110 to provide a safety feature which prevents a change in selection of the throttle pedal position and auxiliary electronic throttle sensors 28, 108 while the ignition switch is turned on.

Figure 7:
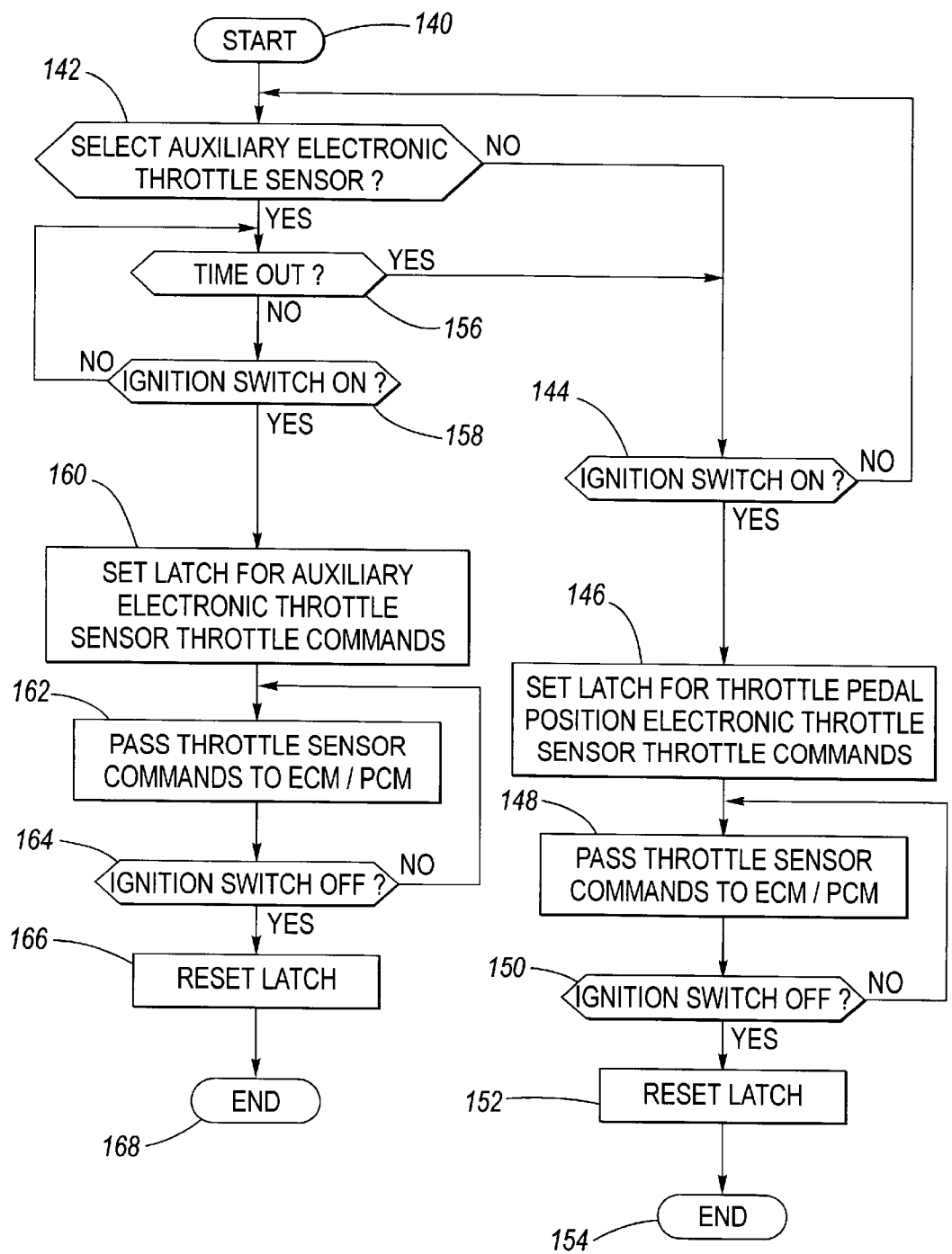
FIG. 7 is a functional block diagram for carrying out operation of an electronic mobility enhancement throttle interface of the mobility enhancement system of FIG. 6.

FIG. 7 is a functional block diagram for implementing the present invention and starts at Block 140. If the auxiliary electronic throttle sensor 108 is not selected at Block 142, and if the ignition switch is turned on at Block 144, then a latch is set at Block 146 for retaining the throttle pedal position electronic throttle sensor commands, whereby the throttle sensor commands are passed to the ECM/PCM 30 at Block 148. The throttle pedal position electronic throttle sensor commands continue to be passed to the ECM/PCM at Block 148 through Block 150 until the ignition switch is turned off at Block 150, at which time the latch set in Block 146 is reset at Block 152, and the process ends at Block 154. Revisiting Block 144, if the ignition switch was not turned on at Block 144, then control passed back to Block 142.

If the driver selects the auxiliary electronic throttle sensor 108 via actuation of the activation switch 114 prior to turning on the ignition switch at Block 142, then control passes to Block 156. If the auxiliary electronic throttle sensor 108 selection at Block 142 times-out at Block 156 (as for example a 10 second delay between actuation of the activation switch 114 and turning on of the ignition switch 120), then control passes to Block 144 and proceeds as previously described. If, however, the selection at Block 142 does not time out at Block 156 and the ignition switch has not yet been turned on at Block 158, control passes back to Block 156 awaiting either a time-out at Block 156 (as described) or the turning on of the ignition switch at Block 158. Now, if the ignition switch is turned on at Block 158 before a time-out at block 156, then the latch 118 is set at Block 160 for retaining auxiliary electronic throttle sensor commands, whereby the throttle sensor commands are subsequently passed to the ECM/PCM 30 at Block 162 through Block 164 until the ignition switch 120 is turned off at Block 164, at which time the latch set in Block 160 is reset at Block 166, and the process ends at Block 168.

Figure 8:
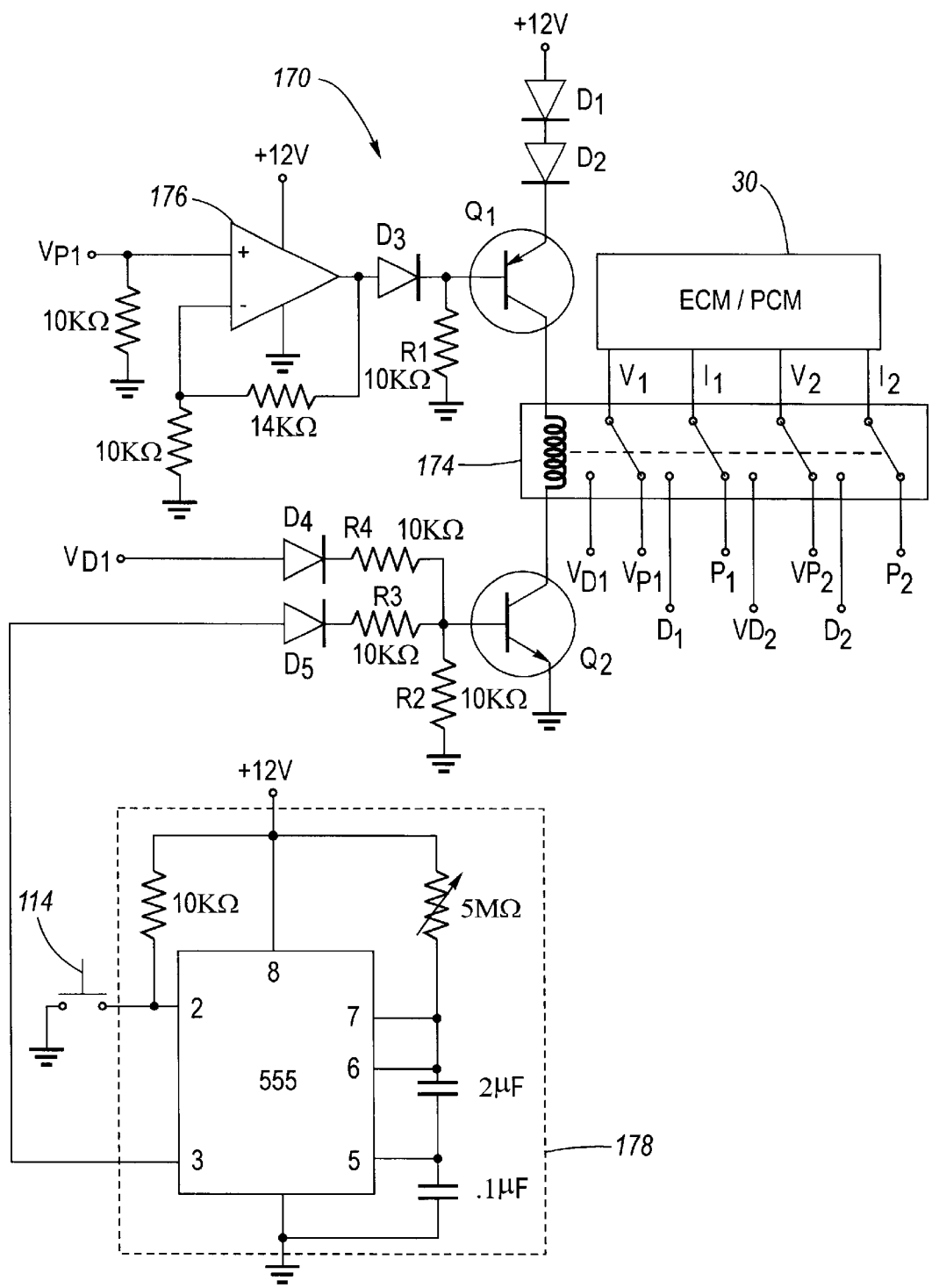
FIG. 8 is an example of an electronic circuit for implementing the functional block diagram of FIG. 7.

FIG. 8 is an example of an electronic circuit 170 for implementing the functional block diagram of FIG. 7. Within the data switch 110 is a Relay 174, which is a 4-pole double-throw (4PDT) relay shown in its de-energized (or deactivated) state. The Relay 174 provides the interface to the ECM/PCM 30 and selects alternatively one or the other of the throttle pedal position electronic throttle sensor 28 and the auxiliary electronic throttle sensor 108, under control of Q1 and Q2. $V_1$ and $V_2$ are 5-volt control signals generated by the ECM/PCM 30 when the ignition switch is turned on and both are either supplied, depending on the state of the Relay 174, to the two potentiometers (per this example) of the throttle pedal position electronic throttle sensor 28 as $V_{P1}$ and $V_{P2}$, or the two potentiometers (per this example) of the auxiliary electronic throttle sensor 108 as $V_{D1}$ and $V_{D2}$, respectively. In this regard the two potentiometers of each electronic throttle sensor 28, 108 are identical. $I_1$ and $I_2$ are the throttle (or torque) input to the ECM/PCM 30 from either the throttle pedal position electronic throttle sensor 28 or the auxiliary electronic throttle sensor 108, as determined by the state of the Relay 174. The +12V voltage supply is available independent of the on/off state of the ignition switch.

If the activation switch 114 is not actuated and the ignition switch is turned off, Q1 is biased on through 10 kilo-ohm resistor R1, but Q2 is biased off through 10 kilo-ohm resistor R2 preventing the Relay 174 from being energized, and thereby selecting the throttle commands $P_1$ and $P_2$ from the throttle pedal position electronic throttle sensor 28 as the inputs $I_1$ and $I_2$ to the ECM/PCM 30 through the Relay 174. However, if the ignition switch is turned on, the ECM/PCM 30 provides 5-volt control signals $V_{P1}$ and $V_{P2}$ to the throttle pedal position electronic throttle sensor 28 from the ECM/PCM 30 through the Relay 74, whereby the 5-volt control signal $V_{P1}$ is input to the non-inverting terminal of an operational amplifier 176 whose output, passed by diode D3, biases Q1 off and ensures that Relay 174 remains de-energized and the throttle pedal position electronic throttle sensor remains selected until the ignition switch is turned off, regardless of the subsequent on/off state of the activation switch 114. When the ignition switch is turned off, Relay 174 remains de-energized.

Actuating the activation switch 114 activates a Timer 178 of Latch 118, in this example a 555 timer, for a predetermined time period, for example ten seconds. Q1 is biased on through 10 kilo-ohm resistor RI, and Q2 is biased on by the output of the Timer 178 through D5 and 10 kilo-ohm resistor R3 connected to the base of Q2, by which the Relay 174 is energized, thereby selecting the throttle commands D1 and D2 from the auxiliary electronic throttle sensor 108 as the inputs $I_1$ and $I_2$ to the ECM/PCM 30 through the Relay 174. The auxiliary electronic throttle sensor 108 has an electronic function similar to the throttle pedal position electronic throttle sensor 28, whereby the ECM/PCM 30 transparently sees either. If the ignition switch is turned on before the Timer 178 times out, Q1 remains biased on through a 10 kilo-Ohm resistor R1 and the ECM/PCM 30 provides 5-volt control signals $V_{D1}$ and $V_{D2}$ to the auxiliary electronic throttle sensor 108 from the ECM/PCM 30 through the Relay 174, whereby the 5-volt control signal $V_{D1}$ passed by diode D5 and 10 kilo-ohm resistor R4 biases Q2 on, ensuring that the Relay 174 remains energized and the auxiliary electronic throttle sensor 108 remains selected until the ignition switch is turned off, regardless of the subsequent state of the activation switch 114. When the ignition switch is turned off, Q2 is biased off and the Relay 174 is de-energized. However, if the Timer 178 has timed-out before the ignition switch is turned on, Q2 is biased off and the Relay 174 is de-energized, whereby the activation switch 114 must be again actuated with the ignition switch off in order to reselect the auxiliary electronic throttle sensor as the input to the ECM/PCM 30. In the foregoing, the on/off states of the ignition switch may also be regarded as first and second states of the engine.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. In a motor vehicle having an engine, and an electronic controller controlling throttle settings of the engine, an improvement thereto comprising an electronic mobility throttle enhancement interface, comprising:
   an auxiliary electronic throttle sensor;
   an auxiliary throttle control providing selective settings of said auxiliary electronic throttle sensor; and
   an electronic circuit operatively interfacing said auxiliary electronic throttle sensor with respect to the engine electronic controller, wherein throttle settings of the engine are responsive to the selective settings of said auxiliary electronic throttle control.

2. An electronic throttle control for an engine of a motor vehicle, comprising:
   an electronic controller controlling throttle settings of the engine;
   a throttle pedal position electronic throttle sensor; and
   an electronic mobility throttle enhancement interface, comprising:
     an auxiliary electronic throttle sensor;
     an auxiliary throttle control providing selective settings of said auxiliary electronic throttle sensor; and
     an electronic circuit selectively interfacing said auxiliary electronic throttle sensor and said throttle pedal position electronic throttle sensor with respect to the electronic controller;
   wherein throttle settings of the engine are responsive to the selective settings of a selected one of said throttle pedal position electronic throttle sensor and said auxiliary electronic throttle sensor.

3. The electronic throttle control of claim 2, further comprising means for selecting the selected one of said throttle pedal position electronic throttle sensor and said auxiliary electronic throttle sensor, wherein selection of said conventional electronic throttle sensor is a default selection.

4. The electronic throttle control of claim 3, wherein said electronic circuit further comprises a latch which retains the selection responsive to continued occurrence of a preselected state of the engine.

5. The electronic throttle control of claim 3, wherein said selection is effective for a predetermined time prior to a preselected state of the engine occurring, otherwise the default selection is effective.

6. The electronic throttle control of claim 5, wherein said electronic circuit further comprises a latch which retains the selection responsive to continued occurrence of the preselected state of the engine.

7. A motor vehicle equipped with a mobility enhancement system, comprising:
   an engine;
   an electronic controller controlling throttle settings of the engine;
   an ignition switch controlling operational status of the engine;
   a throttle pedal position electronic throttle sensor; and
   an electronic mobility throttle enhancement interface, comprising:
      an auxiliary electronic throttle sensor;
      an auxiliary throttle control providing selective settings of said auxiliary electronic throttle sensor; and
      an electronic circuit selectively interfacing said auxiliary electronic throttle sensor and said throttle pedal position electronic throttle sensor with respect to the electronic controller;
   wherein throttle settings of the engine are responsive to the selective settings of a selected one of said throttle pedal position electronic throttle sensor and said auxiliary electronic throttle sensor.

8. The motor vehicle of claim 7, further comprising means for selection of the selected one of said throttle pedal position electronic throttle sensor and said auxiliary electronic throttle sensor, wherein said throttle pedal position electronic throttle sensor is a default selection.

9. The motor vehicle of claim 8, wherein said electronic circuit retains the selection as long as the ignition switch is switched to an on state.

10. The motor vehicle of claim 8, wherein said selection is effective for a predetermined time prior to the ignition switch being switched to an on state, otherwise the default selection is effective.

11. The motor vehicle of claim 10, wherein said electronic circuit retains the selection as long as the ignition switch is switched to the on state.

* * * * *